United States Patent
Kosaka et al.

(10) Patent No.: US 8,015,318 B2
(45) Date of Patent: Sep. 6, 2011

(54) ELECTRONIC FILE PROCESSOR, ELECTRONIC FILE PROCESSING PROGRAM RECORDING MEDIUM, AND ELECTRONIC FILE PROCESSING METHOD

(75) Inventors: Fumi Kosaka, Kanagawa (JP); Takahiko Shimizu, Kanagawa (JP); Mitsuhiro Kajitani, Kanagawa (JP); Hajime Sugino, Kanagawa (JP); Michiko Muramoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 256 days.

(21) Appl. No.: 12/055,722

(22) Filed: Mar. 26, 2008

(65) Prior Publication Data
US 2008/0244092 A1    Oct. 2, 2008

(30) Foreign Application Priority Data
Apr. 2, 2007 (JP) ................... 2007-096632

(51) Int. Cl.
*G06F 15/16* (2006.01)
(52) U.S. Cl. ........................ 709/246; 709/206
(58) Field of Classification Search .......... 709/205–207, 709/246
See application file for complete search history.

(56) References Cited

U.S. PATENT DOCUMENTS

| | | | | |
|---|---|---|---|---|
| 7,213,078 B2* | 5/2007 | Matsuura et al. | ............ | 709/246 |
| 7,269,664 B2* | 9/2007 | Hutsch et al. | ................. | 709/246 |
| 7,444,381 B2* | 10/2008 | Malik | ........................ | 709/206 |
| 2003/0041112 A1 | 2/2003 | Tada et al. | | |
| 2005/0120309 A1* | 6/2005 | Jang | ............... | 715/781 |
| 2006/0031309 A1* | 2/2006 | Luoffo et al. | ................. | 709/206 |

FOREIGN PATENT DOCUMENTS

| | | |
|---|---|---|
| JP | 2002049570 | 2/2002 |
| JP | 2002215539 | 8/2002 |
| JP | 2003030117 | 1/2003 |
| JP | 2003067306 | 3/2003 |
| JP | 2005166039 | 6/2005 |
| JP | 200679266 | 3/2006 |

* cited by examiner

*Primary Examiner* — Yasin Barqadle
(74) *Attorney, Agent, or Firm* — Gesmer Updegrove LLP (57) ABSTRACT

An electronic file processor includes an acquisition unit that acquires, through a communication network, a first electronic file having a first file format and a second electronic file having a second file format which differs from the first file format, by reference to a linkage relationship between the first electronic file and the second electronic file; a conversion unit that converts at least one of the first electronic file and the second electronic file so that the first electronic file and the second electronic file have a same file format; and a generation unit that combines the first electronic file and the second electronic file to generate a combined electronic file.

20 Claims, 10 Drawing Sheets

ATTACHMENT FILE STORAGE CONFIGURATION SELECTION — 180

| STORAGE CONFIGURATION SELECTION — 182 | | FILE NAME INPUT — 184 | STORAGE DESTINATION DESIGNATION — 186 |
|---|---|---|---|
| ONLY ATTACHMENT FILE | ○ | | |
| ATTACHMENT FILE + MAIL BODY | ○ | | |
| ATTACHMENT FILE + MAIL BODY + HEADER | ● | 07/02/21/abcde / | http : // wiki . • • • |
| ATTACHMENT FILE + MAIL BODY + HEADER + RELATED ATTACHMENT FILE | ○ | | |
| ALL ATTACHMENT FILES + MAIL BODY | ○ | | |
| DESIGNATION OF INSERTION DESTINATION OF ADDITIONAL INFORMATION (TOP PAGE, PAGE DESIGNATION, FINAL PAGE ···) | | | |
| COMMENT FORM : | | | |

190 — ONLY ATTACHMENT FILE
192 — ATTACHMENT FILE + MAIL BODY
194 — ATTACHMENT FILE + MAIL BODY + HEADER
195 — ATTACHMENT FILE + MAIL BODY + HEADER + RELATED ATTACHMENT FILE
196 — ALL ATTACHMENT FILES + MAIL BODY
198 — DESIGNATION OF INSERTION DESTINATION OF ADDITIONAL INFORMATION
200 — COMMENT FORM

ELECTRONIC FILE PROCESSOR, ELECTRONIC FILE PROCESSING PROGRAM RECORDING MEDIUM, AND ELECTRONIC FILE PROCESSING METHOD

CROSS-REFERENCE TO RELATED APPLICATIONS

This application is based on and claims priority under 35 USC 119 from Japanese Patent Application No. 2007-96632 filed on Apr. 2, 2007.

BACKGROUND

1. Technical Field

The present invention relates to an electronic file processor, an electronic file processing program recording medium, and an electronic file processing method.

2. Related Art

An electronic file acquired through a communication network and an electronic file linked to such an electronic file may be separated when the electronic file is supplied to a certain process. For example, an attachment file attached to an electronic mail is often detached from the electronic mail and used.

SUMMARY

According to one aspect of the invention, there is provided an electronic file processor including an acquisition unit that acquires, through a communication network, a first electronic file having a first file format and a second electronic file having a second file format which differs from the first file format, by reference to a linkage relationship between the first electronic file and the second electronic file; a conversion unit that converts at least one of the first electronic file and the second electronic file so that the first electronic file and the second electronic file have the same file format; and a generation unit that combines the first electronic file and the second electronic file to generate a combined electronic file.

BRIEF DESCRIPTION OF THE DRAWINGS

Exemplary embodiment(s) of the present invention will be described in detail by reference to the following figures, wherein.

DETAILED DESCRIPTION

[Explanation of Terms]

Here, some of the terms used in the claims, specification, and drawings will be explained.

An "electronic file processor" is a device in which computer hardware is controlled by a software so that an inputting unit, a conversion unit, and a generation unit are formed. The electronic file processor may further include an acquisition unit or an outputting unit. Alternatively, the acquisition unit may be provided in another device which communicates with the electronic file processor. Alternatively, the acquisition unit may also function as the inputting unit.

The acquisition unit acquires two electronic files; that is, a first electronic file and a second electronic file, having file formats which differ from each other, through a communication network such as the Internet or a local area network. An "electronic file" is a set of data which is collectively handled by a computer application. Examples of an electronic file include a document file including a document, an image file including an image, and a chart file including a chart.

A "file format" is a rule for describing data in a file. For example, examples of a file format of a document file include a text format and various word processor software formats. Examples of a file format of a still image file include JPEG (Joint Photographic Experts Group) format and PNG (Portable Network Graphics) format. The first electronic file and the second electronic file have different file formats. In some cases, multiple versions exist for a file format. The determination of whether or not file formats of different versions are to be handled as the same file format may be made on the basis of whether or not the formats satisfy the conditions that the application software handling the files can handle the files as having substantially the same file format, and the files can be combined in the generation unit.

The first electronic file and the second electronic file are in a linkage relationship. A "linkage relationship" is a relationship in which the two electronic files are related in the file structure. Examples of linkage relationships include a case in which one electronic file is embedded in the other electronic file and a case in which one electronic file is attached to the other electronic file. More specifically, an example of a linkage relationship would be a configuration in which an attachment file which is encoded in MIME (Multipurpose Internet Mail Extensions) is attached to a text file forming a header or a body of an electronic mail. An "electronic mail" is a message transfer method defined in RFC (Request For Comments) 2822 or the like, and "MIME" is a standard for encoding electronic files having various file formats as an attachment file in an electronic mail. Therefore, the attachment file may be considered to be a part of the electronic file (is included in the electronic file), or may be considered to be attached (appended) to the electronic file. The description here is based on the latter understanding.

Other examples of linkage relationships are a configuration in which both electronic files are embedded in an electronic file including the electronic files, and a configuration in which one or both of the electronic files is a hypertext and the other electronic file is linked. A "hypertext" is an electronic file having a system which embeds (links to) location information of another electronic file and accesses the electronic file. Hypertext is typically used in describing a structure of a webpage in a website which publicizes data through HTTP (HyperText Transfer Protocol).

The acquisition unit acquires the two electronic files by reference to the linkage relationship between the two electronic files. An "acquisition based on the linkage relationship" is an acquisition form to acquire both electronic files while recognizing the presence or relevance of the two electronic files using the linkage relationship or an acquisition form to automatically and collectively acquire the two electronic files because of the existence of the linkage relationship. The acquisition unit may acquire the electronic files on the basis of various communication rules (protocols). Examples of communication rules include an electronic mail, HTTP, and FTP (File Transfer Protocol). The acquired electronic file is typically stored in a storage device such as a semiconductor memory or a magnetic disk. The acquisition unit may acquire three or more electronic files. In this case, at least two of the electronic files have the file format relationship and linkage relationship as described above.

The inputting unit inputs the two electronic files acquired by the acquisition unit in this manner into an electronic file processor. The two electronic files may be input consecutively or at separate timings. When the acquisition unit is provided in the electronic file processor, the acquisition unit and the inputting unit are recognized as the same unit.

The conversion unit converts a part or all of the first electronic file and the second electronic file into the same file format. The conversion may be executed in one of the following two configurations. In a first configuration, the file format is matched to the file format of the second electronic file. In this case, a part or all of the first electronic file may be converted to the file format of the second electronic file. In a second configuration, the file format is matched to a file format which differs from the file format of the first electronic file and also differs from the file format of the second electronic file. In this case, in addition to the part or all of the first electronic file, the file format of the second electronic file must also be converted.

When the file format is to be actually converted on the computer, various processing configurations maybe employed. For example, an electronic file after the conversion may be generated by rewriting the electronic file before conversion, or a new electronic file may be generated while leaving the electronic file before conversion. Alternatively, for example, a part or all of the electronic file before conversion may be copied to generate a new electronic file, and the conversion of the file format may be executed on this new electronic file. However, determination as to whether or not the file format of the part or all of the first electronic file is converted or the file format of the second electronic file is converted in this description should be made in consideration of the substance of the process, and, more specifically, should be evaluated in consideration of whether or not an electronic file is generated having a part or all of the contents of the electronic file before conversion and with a changed file format.

The generation unit combines a part or all in a part or all of the first electronic file having the file format converted (although, strictly speaking, this file differs from the original first electronic file because of the conversion, the same name of "first electronic file" will be continued to be used for convenience) and the second electronic file (original electronic file if not converted and converted electronic file if converted), to generate a combined electronic file. The electronic file generated by the combination may be a new electronic file or may be an electronic file created by rewriting the electronic file before combination (in other words, the original electronic file with an added portion).

The outputting unit outputs the electronic file obtained as a result of the combination process by the generation unit. The output destination of the outputting unit may be an external device or may be a device provided inside the electronic file processor (for example, a storage device).

The processes in the acquisition unit, inputting unit, conversion unit, generation unit, and outputting unit as described above may be executed while an instruction issued by the user is received or may be automatically executed according to a programmed setting.

Exemplary Embodiment

An exemplary embodiment will now be described.

Figure 1:
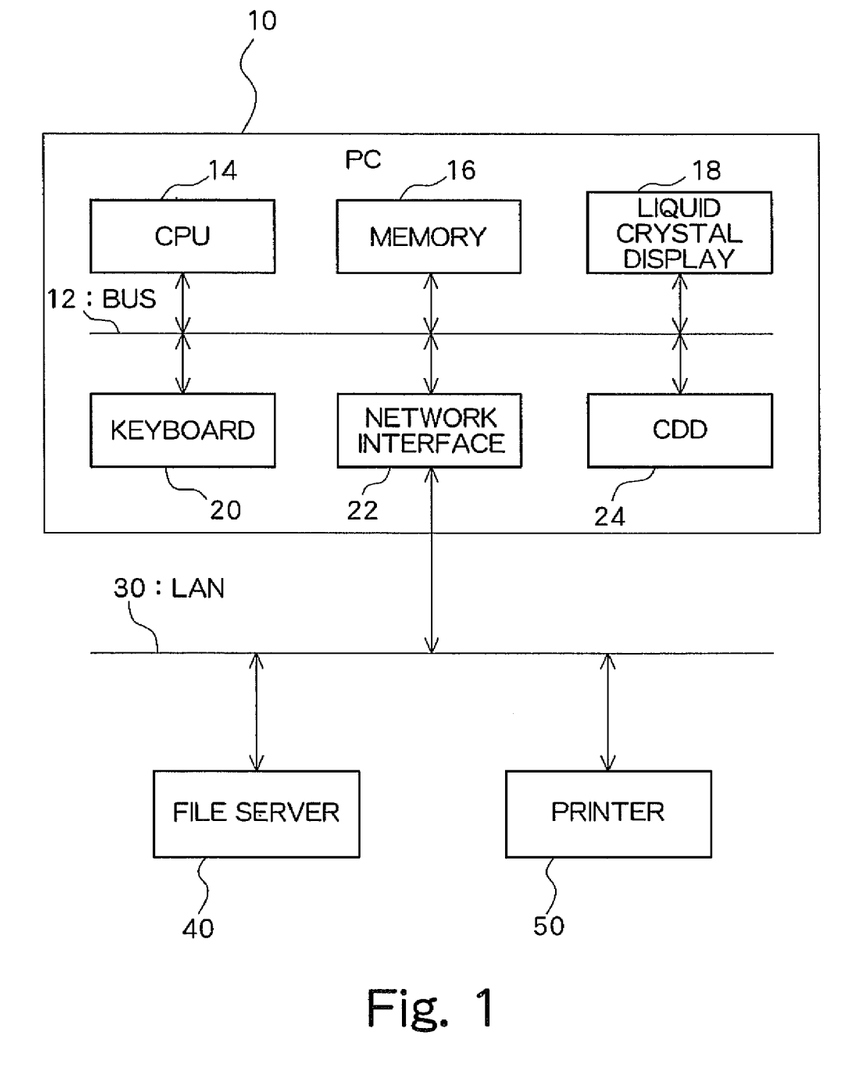
FIG. 1 is a schematic diagram showing an example hardware structure of an exemplary embodiment of the present invention.

FIG. 1 is a schematic block diagram for explaining a hardware structure of the exemplary embodiment. FIG. 1 shows a PC (Personal Computer) 10, a LAN (Local Area Network) 30 to which the PC 10 is connected, and a file server 40 and a printer 50 which are connected to the LAN 30.

The PC 10 is a device having a function as an electronic file processor. The PC 10 includes a bus 12 which is an internal communication path, a CPU (Central Processing Unit) 14 connected to the bus 12, a memory 16, a liquid crystal display 18, a keyboard 20, a network interface 22, and a CDD (Compact Disk Drive) 24.

The CPU 14 is a device having an arithmetic logical calculation circuit or the like, and executes a calculation process according to a program stored in the memory 16. With this process, the CPU 14 functions as various processing units and also as an operation controlling unit for various devices in the PC 10.

The memory 16 is a storage device constructed from a ROM (Read Only Memory) or a RAM (Random Access Memory) created from a semiconductor. A large capacity storage device using a magnetic disk or the like may be provided in the PC 10.

The liquid crystal display 18 is a display device which forms an image corresponding to data and displays the image for a user. The keyboard 20 is a user input device which converts an instruction from a user into an electrical signal and communicates to the CPU 14. The liquid crystal display 18 and the keyboard 20 function as a user interface (UI) for the user to operate the PC 10.

The network interface 22 is an interface for transmitting and receiving data to and from an external device through the LAN 30. In the PC 10, for example, an electronic mail may be transmitted or received and a website may be accessed through the network interface 22. The data acquired in this manner (including an electronic file) may be stored in the memory 16 or displayed on the liquid crystal display 18. When a program for controlling the CPU 14 is provided by an external device, the program is stored in the memory 16 through the network interface 22.

The CDD 24 is a device for reading from and writing to a CD (Compact Disk) which serves as a recording medium. For example, when a program for controlling the CPU 14 is recorded on a CD and provided, the program is stored in the memory 16 through the CDD 24.

The LAN 30 is a network (communication network) used in a limited environment such as a company organization. The LAN 30 is normally connected to a large network such as the Internet.

The file server 40 is a computer having a large-capacity storage device. The file server 40 typically includes devices similar to the PC 10 within the file server 40.

The printer 50 is a computer having a printing function to print on paper based on an electronic file for printing. In many cases, the printer 50 also includes devices similar to the PC 10 within the printer 50.

Figure 2:
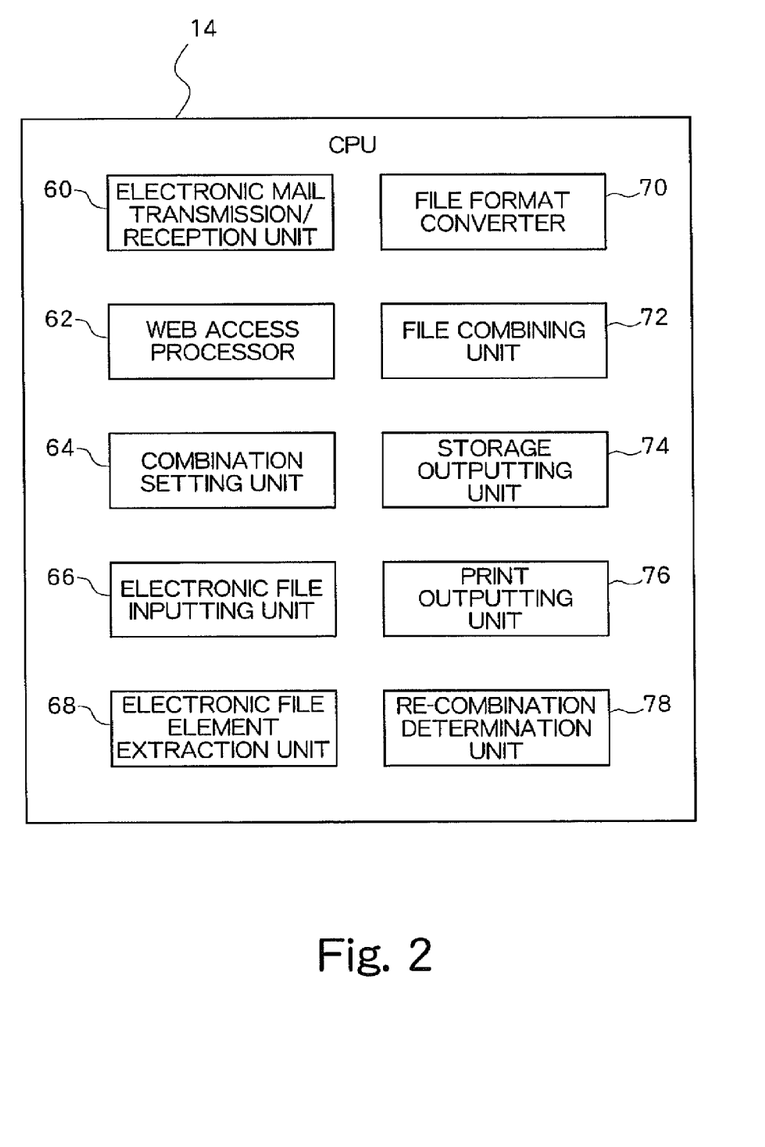
FIG. 2 is a diagram showing an example of functions constructed on a CPU.

A role of the CPU 14 of the PC 10 will now be described in detail with reference to FIG. 2. FIG. 2 is a block diagram showing a portion of the processing functions constructed on the CPU 14 based on the program stored in the memory 16. The processing functions described herein relate to a process to acquire, through the network interface 22 and from the network, multiple electronic data which are in a linkage relationship, to convert the file format, and to combine the converted electronic data into a single set of electronic data. Such a program may be implemented as, for example, application software for transmitting or receiving electronic mail, an application software for accessing a webpage (also referred to as "web browser"), or plug-in software to be incorporated into such application software.

The CPU 14 specifically includes processing functions of an electronic mail transmission/reception unit 60, a web access processor 62, a combination setting unit 64, an electronic file inputting unit 66, an electronic file element extraction unit 68, a file format converter 70, a file combining unit 72, a storage outputting unit 74, a print outputting unit 76, and a re-combination determination unit 78.

The electronic mail transmission/reception unit 60 transmits and receives an electronic mail through the network interface 22. In particular, upon receipt of an electronic mail to which an attachment file is attached, the electronic mail transmission/reception unit 60 functions as an acquisition unit which acquires two (or more) electronic files which are in a linkage relationship, and as an inputting unit which inputs an electronic file acquired in such a manner. The acquired electronic mail (including the attachment file) is stored in the memory 16 or the like.

The web access processor 62 transmits and receives data to and from a website through HTTP. Upon receipt of an HTML (HyperText Markup Language) file as a hypertext, the web access processor 62 analyzes the structure of the HTML file and executes a display process to display the file on the liquid crystal display 18. When a user instructs an access to a link destination within the HTML file, the web access processor 62 receives the electronic file from the link destination and executes the display process, and temporarily stores the electronic file in the memory 16. When the user instructs downloading with respect to the link destination within the HTML file, the web access processor 62 receives the electronic file from the link destination and stores the same in the memory 16. In this manner, upon receipt of the hypertext of an origin of a link and an electronic file of a link destination, the web access processor 62 functions as the acquisition unit which acquires two (or more) electronic files which are in a linkage relationship. The web access processor 62 also functions as an inputting unit which inputs an electronic file thus acquired.

The combination setting unit 64 sets a form of combination of two (or more) electronic files which are in the linkage relationship and stored in the memory 16. This setting is executed by reference to an instruction from a user which is input from the keyboard 20.

The electronic file inputting unit 66 reads electronic files which are in the linkage relationship and stored in the memory 16, and inputs the electronic files to the CPU 14. In view of this, when the CPU 14 which is controlled by a program can be considered an electronic file processor, the electronic file inputting unit 66 may be considered an inputting unit.

The electronic file element extraction unit 68 executes a process to extract (cut out) a necessary element from multiple input electronic files. The element to be extracted is determined from a setting which is set by the combination setting unit 64. When a process is executed for the electronic mail to which an attachment file is attached, for example, the attachment file, the header (a part or all of the header) of the electronic mail, and the body (a part of all of the body) of the electronic mail are extracted. When a process is executed for a hypertext and a download file linked from the hypertext, for example, an electronic file which is embedded in the hypertext but is not related to the display of the hypertext (for example, another electronic file to be downloaded) is not to be extracted and a part or all of an electronic file which is embedded in the hypertext and which is displayed along with the hypertext (for example, an electronic file representing an image to be displayed) is to be extracted. It is also possible to employ a configuration in which the electronic file which is not to be extracted is not input to the CPU 14.

The file format converter 70 functions as a conversion unit, and converts a file format of an electronic file to be processed. The file format converter 70 converts the file formats so that multiple electronic files which are in the linkage relationship have the same file format. Typically, the file format is unified to the file format of the electronic file to be primarily stored, but the file format may be unified to another file format. For example, when there is another file format having a relatively higher compression rate or higher functionality than the file format of the electronic file to be primarily stored, this file format may be employed. Alternatively, the unification file format may be determined by reference to the setting by the combination setting unit 64. The file format conversion is typically executed by referring to a conversion rule which correlates the file format before conversion and a file format after the conversion (which is stored in the memory 16 in the form of a conversion table, for example). Alternatively, a configuration may be employed in which the file format is once converted into an intermediate file format, and then to the final file format.

The file combining unit 72 functions as a generation unit, and combines electronic files having the file format converted. A "combination" is a process to electronically bundle two or more electronic files of the same file format so that the electronic files can be managed as a bundle. For example, the electronic files to be combined may be bundled with a line feed therebetween, or may be bundled by overlapping on a same page at the front, rear, or an arbitrary position.

The storage outputting unit 74 outputs the electronic file acquired as a result of the combination by the file combining unit 72 in a storage destination. It is possible to employ a configuration, for example, in which the memory 16 or the file server 40 can be selected as the storage destination. Thus, the storage outputting unit 74 functions as an outputting unit.

The print outputting unit 76 outputs the electronic file acquired as a result of the combination by the file combining unit 72 to the printer 50 so that the printer 50 can print. The print outputting unit 76 may further output an electronic file, which is output by the storage outputting unit 74, to the printer 50. The print outputting unit 76 functions as an outputting unit similar to the storage outputting unit 74.

The re-combination determining unit 78 determines whether or not a related electronic file is to be further combined to the electronic file acquired as a result of the combination by the file combining unit 72. Here, the related electronic file refers to some type of relevance, which may be, for example, a relevance in the file structure or relevance as contents (based on, for example, semantic analysis). The re-combination determining unit 78 determines whether or not the file is to be re-combined, by reference to a set determination criterion. Examples of the re-combination criteria include a criterion to determine, when a new electronic mail is received in a case where a body or a header of an electronic mail is already combined with an attachment file, the newly received electronic file having the same subject or same reference ID as the electronic mail, that the body of the new electronic mail is to be re-combined. The concrete process in the re-combination may be implemented by suitably using the combination setting unit 64, the electronic file inputting unit 66, the electronic file element extraction unit 68, the file format converter 70, the file combining unit 72, the storage outputting unit 74, and the print outputting unit 76. In other words, the re-combination determining unit 78 and these various units function as a re-combination unit.

Figure 3:
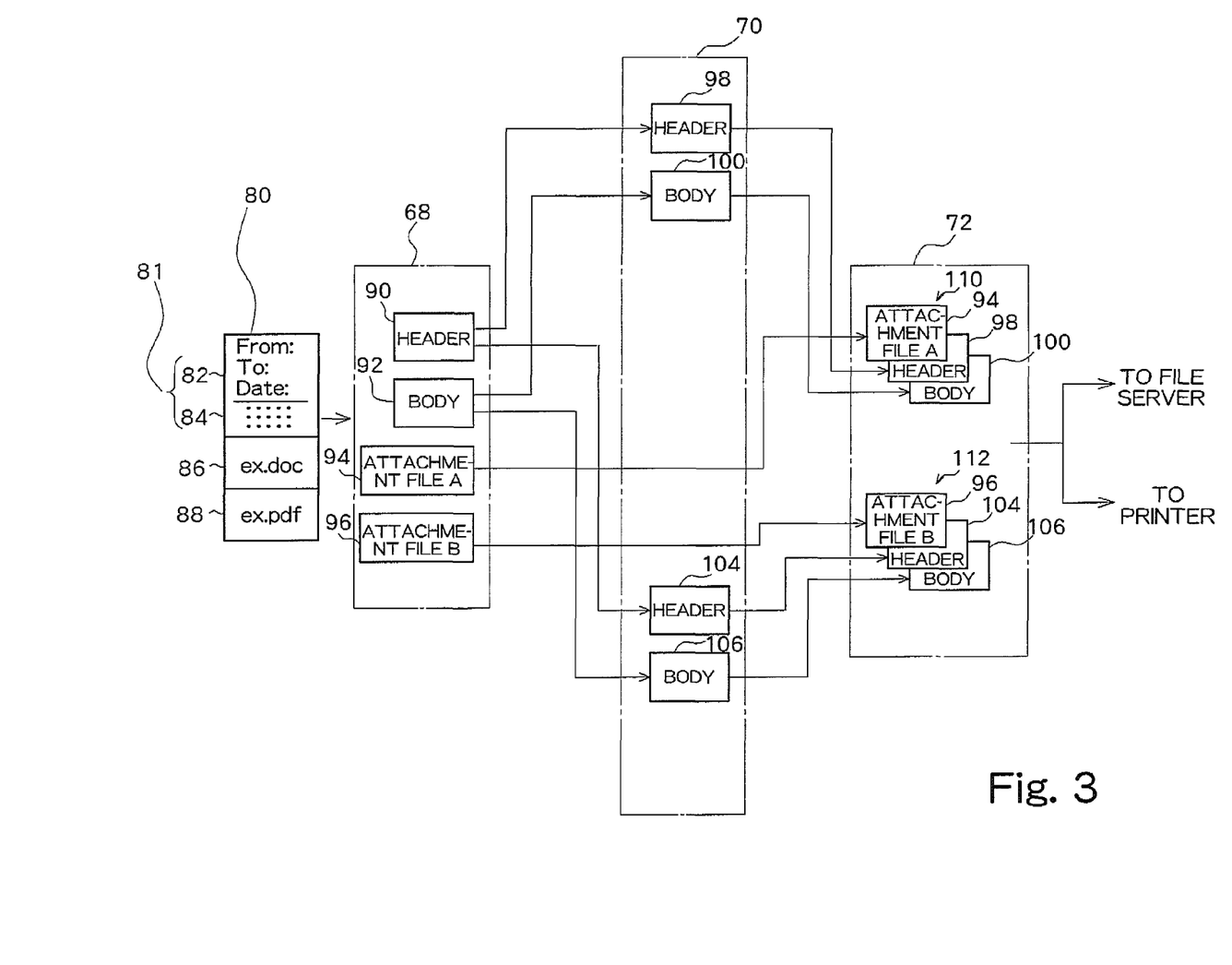
FIG. 3 is a diagrammatic view for explaining an example of a process for an electronic mail.
Figure 4:
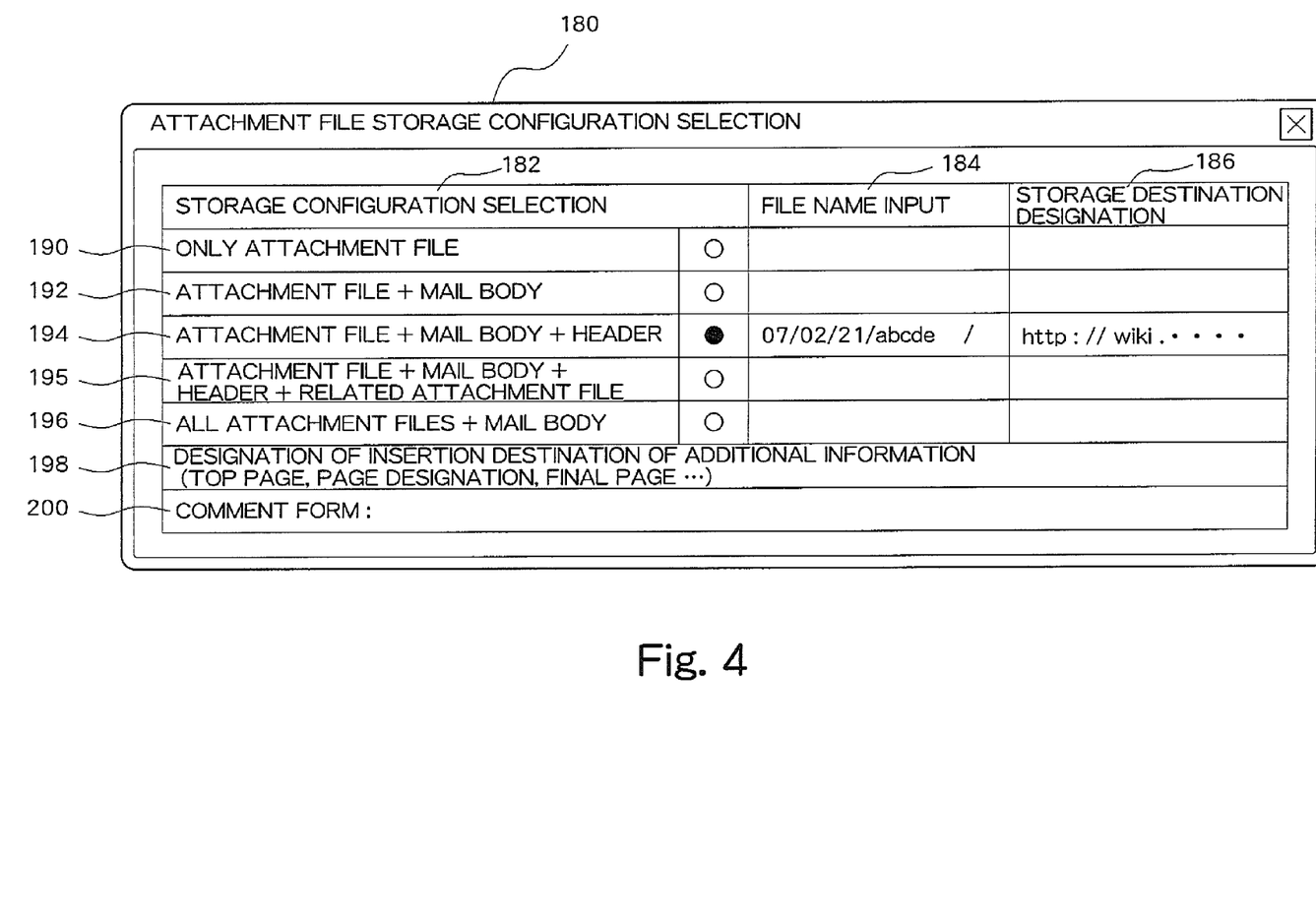
FIG. 4 is a diagram showing an example of a window for user selection.
Figure 5:
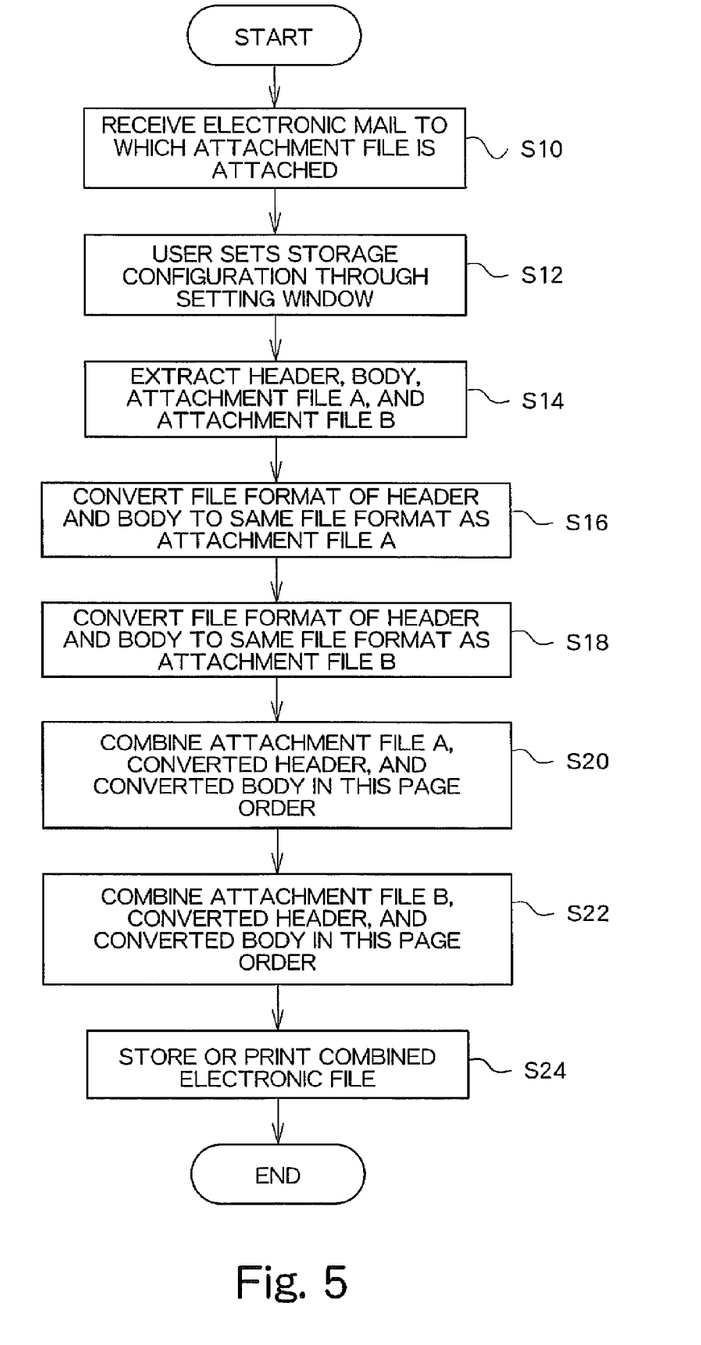
FIG. 5 is a flowchart for explaining an example flow of a process for an electronic mail.

Next, a process executed in the PC 10 when an electronic mail is received will be described with reference to FIGS. 3, 4, and 5. FIG. 3 is a diagrammatic view showing a process of combination and output of an electronic mail to which an attachment file is attached, FIG. 4 is a diagram showing an example of a setting window (graphical user interface) displayed on the liquid crystal display 18 by a control of the combination setting unit 64 during the combination and output process, and FIG. 5 is a flowchart showing a flow of processes in the combination and output process.

The electronic mail transmission/reception unit 60 receives an electronic mail 80 with an attachment file as shown in FIG. 3 (S10). The electronic mail 80 with attachment file includes an electronic mail region 81 having a header 82 and a body 84, and an attachment file A 86 and an attachment file B 88 attached to the electronic mail region 81. The header 82 indicates a region in which an origin (From), destination (To), date (Date), subject, or history of relay in relaying devices of electronic mail are described, or indicates a description in that region. In other words, the header 82 can be considered as having information in which summary of transmission/reception of the electronic mail 80 with attachment file is outlined or an objective record related to the transmission and reception.

Meanwhile, the body 84 is a region in which the transmitter writes a message or a description. In the body 84, typically, subjective information written by the transmitter for the receiver and description related to the attachment file are described. The attachment file A 86 and the attachment file B 88 are files encoded through MIME and embedded in the electronic mail 80 with attachment file. Here, the attachment file A 86 is a document file which is created by word processing software and having a file format unique to the word processing software, and has a file name of "ex.doc". The attachment file B 88 is a document file having a file format of PDF (Portable Document Format), and has a file name of "ex.pdf".

The electronic mail 80 with attachment file may be stored in the memory 16 and managed in this state, similarly to typical devices. In other words, a management configuration may be considered in which the electronic mail region 81 of the electronic mail 80 with attachment file is set as a primary management target and the attachment file A 86 and the attachment file B 88 are set as secondary management target to be managed through the electronic mail region 81.

However, in the exemplary embodiment, the attachment file A 86 and the attachment file B 88 are stored and managed in a configuration different from this configuration. The concrete storage form may follow a predetermined setting or may be determined according to a user instruction through a window shown in FIG. 4 (S12).

In a setting window 180 shown in FIG. 4, columns including a storage configuration selection 182, a file name input 184, and a storage destination designation 186 are provided. In the column of the storage configuration selection 182, five configurations indicated by reference numerals 190-196 are listed as candidates. An "attachment file only" shown by reference numeral 190 represents a storage configuration in which each of the attachment file A 86 and the attachment file B 88 is stored as a single entity. In other words, in this storage form, the attachment file A 86 and the attachment file B 88 are separately managed regardless of the body or the header of the electronic mail, or in correlation to an index or the like which is separately created. An "attachment file+mail body" shown by reference numeral 192 represents a configuration in which each of the attachment file A 86 and the attachment file B 88 is combined with the mail body and stored. An "attachment file+mail body+header" shown by reference numeral 194 represents a configuration in which each of the attachment file A 86 and the attachment file B 88 is combined with the mail body and the header and stored. An "attachment file+mail body+header+related attachment file" shown by reference numeral 195 represents a configuration in which each of the attachment file A 86 and the attachment file B 88 is combined with the mail body, header, and another attachment file (the attachment file B 88 for the attachment file A 86 and the attachment file A 86 for the attachment file B 88) and stored. An "all attachment files+mail body" shown by reference numeral 196 represents a configuration in which the entire attachment file A 86 and entire attachment file B 88 are combined with the mail body and stored. In the storage configurations of reference numerals 190-195, the storage process is executed separately for each attachment file when there are multiple attachment files, but it is also possible to employ a configuration in which the storage process is executed only for a particular attachment file. The selection of which attachment file is to be stored may be made by the user on the setting window 180.

In the illustrated configuration, the user enters a check in the column of the "attachment file+mail body+header" of reference numeral 194 and select this configuration. In a corresponding column of the file name input 184, there is set a file name of "07/02/21/abcde" in which a date of Feb. 21, 2007 and a name of "abcde" are combined, and a storage location in the file server 40 is designated in the column of the storage destination designation 186 by a URL of "http://wiki. . . . ". The input of the file name may be completely delegated to the user, or the file name may be automatically set by reference to the file name which is assigned to the original attachment file, or a recommended candidate maybe presented. Examples of the file name based on the file name of the original attachment file include, for example, a configuration in which the file name of the original attachment file is used or a date is added to the file name of the original attachment file. In the column of storage destination designation 186 also, a recommended candidate may be presented in a similar manner.

In the setting window 180, a column of "additional information insertion destination designation (top page, page designation, final page, . . . )" represented by reference numeral 198 and a column of "comment form:" represented by reference numeral 200 are provided. The former is a column for setting to which page the information is to be re-combined when a related electronic mail is received later. The latter is a column for inputting a comment such as a note, and the input comment is written in the set position (for example, a top page or a final page).

A flow of a process when a form of "attachment file+mail body+header" of reference numeral 194 is selected in the setting window 180 of FIG. 4 will now be described with reference again to FIG. 3. In this case, first, the electronic file inputting unit 66 reads the electronic mail 80 with attachment file from the memory 16, and the electronic file element extraction unit 68 extracts various elements from the electronic mail 80 with attachment file (S14). In the configuration of FIG. 3, each of a header 90, a body 92, an attachment file A 94, and an attachment file B 96 are extracted as a single electronic file. A part or all of the header 82 and the body 84 may be extracted as the header 90 and the body 92. The attachment file A 94 and the attachment file B 96, on the other hand, are the entire extracted attachment file A 86 and entire extracted attachment file B 88 attached to the electronic mail 80 with attachment file.

Then, a file format converter 70 converts the file formats of the header 90 and the body 92 into a file format identical to that of the attachment file A 94 (file format of the word processor software), to generate electronic files for a header 98 and a body 100 (S16). The file format converter 70 also converts the file formats of the header 90 and the body 92 into the file format identical with that of the attachment file B 96 (PDF format), to generate electronic files for a header 104 and a body 106 (S18).

The file combining unit 72 then generates a combined electronic file 110 as shown in FIG. 3 in which the attachment file A 94 is set as the top page, and the header 98 and the body 100 are placed in that page order following the attachment file A 94 (S20). In other words, in the combined electronic file 110, the page order is set so that, when the combined electronic file 110 is displayed on a display device such as a liquid crystal display, first, the attachment file A 94 is displayed, and, with a line feed, the header 98 is displayed, and, further, the body 100 is displayed next. That is, in the combined electronic file 110, the page number of the attachment file A 94 is the smallest (earliest), the page number of the header 98 is next smaller, and the page number of the body 100 is the largest. The combined electronic file 110 is an electronic file having all pages in a file format identical with that of the attachment file A 94. In the combined electronic file 110, an electronic file generated in a file format identical with that of the attachment file A 94 and including information related to the electronic mail to which the attachment file A 94 is attached is piled following the attachment file A 94. Similarly, the file combining unit 72 generates a combined electronic file 112 in which the attachment file B 96, the header 104, and the body 106 are piled in this page order (S22). The combined electronic file 112 has all pages in a file format identical with that of the attachment file B 96.

The generated combined electronic files 110 and 112 are stored in predetermined locations in the file server 40 by the storage outputting unit 74 (S24), and a sharing setting to give authority to view or edit to other users is set as necessary. When the stored combined electronic files 110 and 112 are to be viewed or edited, a user storing the files or a user permitted to share the files accesses the combined electronic files 110 and 112 by means of application software corresponding to the attachment file A 94 or the attachment file B 96. The user may view or edit the attachment file A 94 or the attachment file B 96 in the combined electronic files 110 and 112 or may view (or edit) background information and explanation information combined to the later pages (that is, information included in the header 98, body 100, header 104 and body 106) by means of the application software.

When printing is instructed, the print outputting unit 76 outputs the file to the printer 50 (S24). In this case, the related information (header 98, body 100, header 104, and body 106) are printed following the attachment file A 94 or the attachment file B 96.

Figure 6:
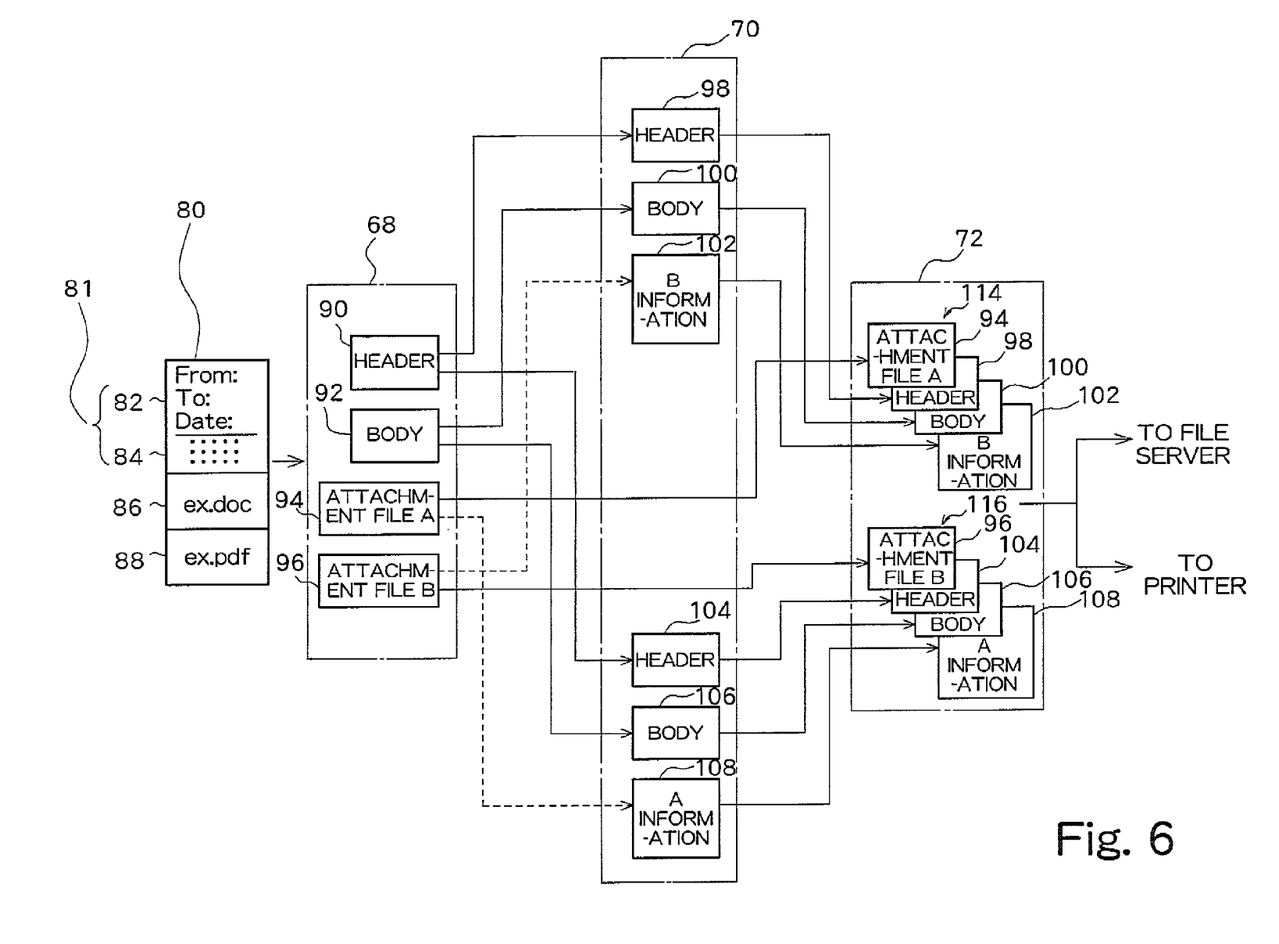
FIG. 6 is a diagrammatic view for explaining an alternative example of a process for an electronic mail.

Next, an alternative exemplary embodiment will be described with reference to FIG. 6. FIG. 6 is a diagrammatic view showing a flow of a process when a form of the "attachment file+mail body+header+related attachment file" shown by reference numeral 195 is selected in the setting window 180 of FIG. 4. Structures identical with those of FIG. 3 are assigned the same reference numerals.

In this example configuration, the file format converter 70 generates a B information file 102 indicating a reference destination of the attachment file B 96 in the same file format as the attachment file A 94 and generates an A information file 108 indicating a reference destination of the attachment file A 94 in the same file format as the attachment file B 96. The file combining unit 72 then generates a combined electronic file 114 having the attachment file A 94 as a top page, and the header 98, the body 100, and the B information file 102 following the top page in this page order and generates a combined electronic file 116 having the attachment file B 96 as a top page, and the header 104, the body 106, and the A information file 108 following the top page in this page order.

Figure 7:
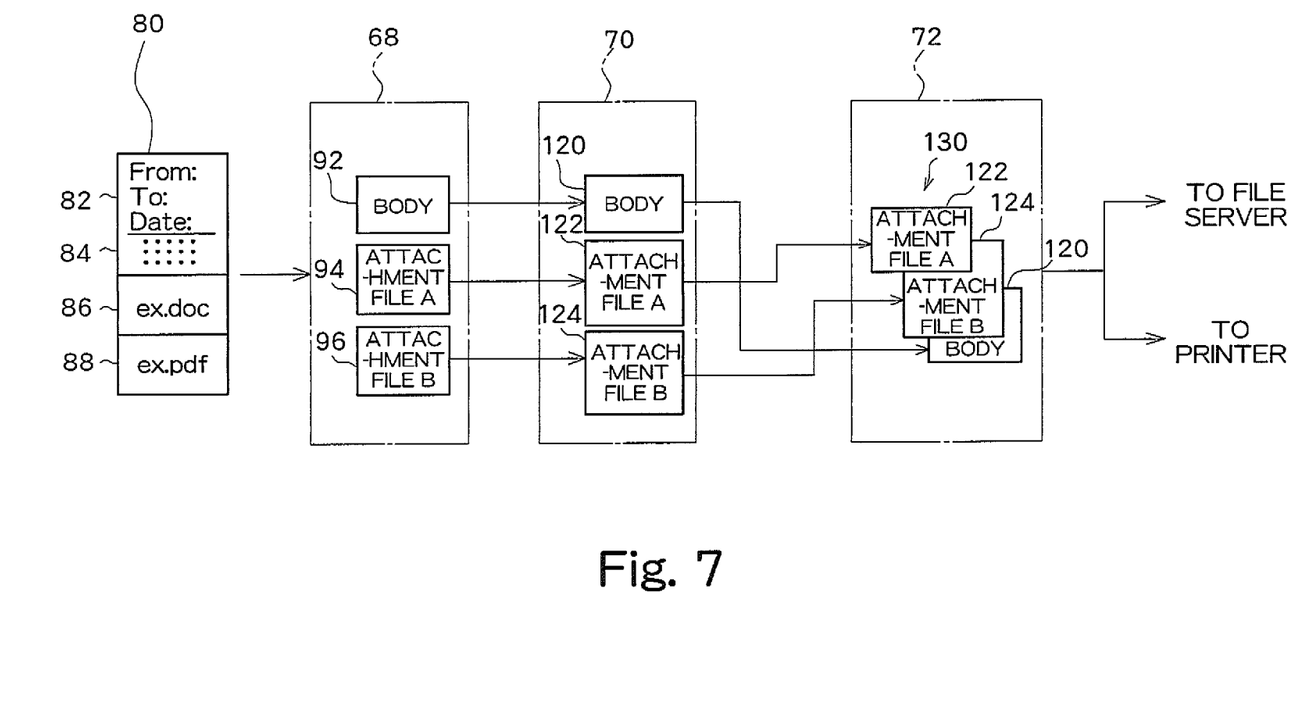
FIG. 7 is a diagrammatic view for explaining an alternative example of a process for an electronic mail.

Next, another alternative exemplary embodiment will be described with reference to FIG. 7. FIG. 7 is a diagrammatic view showing a flow of a process when a form of "all attachment file+mail body" shown by reference numeral 196 is selected in the setting window 180 of FIG. 4, and structures identical with those in FIG. 3 are assigned the same reference numerals.

In this example configuration, the electronic file element extraction unit 68 does not extract the header, and only extracts the body 92, the attachment file A 94, and the attachment file B 96. The file format converter 70 executes file format conversion to all electronic files and generates electronic files of a body 120, an attachment file A 122, and an attachment file B 124. In this file format conversion, for example, the file format is converted to a file format which is compatible with both the file format of the attachment file A 94 and the attachment file B 96 or to a file format which maintains quality or function of both file formats (that is, compatible with the file formats). The file combining unit 72 generates a combined electronic file 130 by piling the attachment file A 122, the attachment file B 124, and the body 120 having the same file format in this order.

Figure 8:
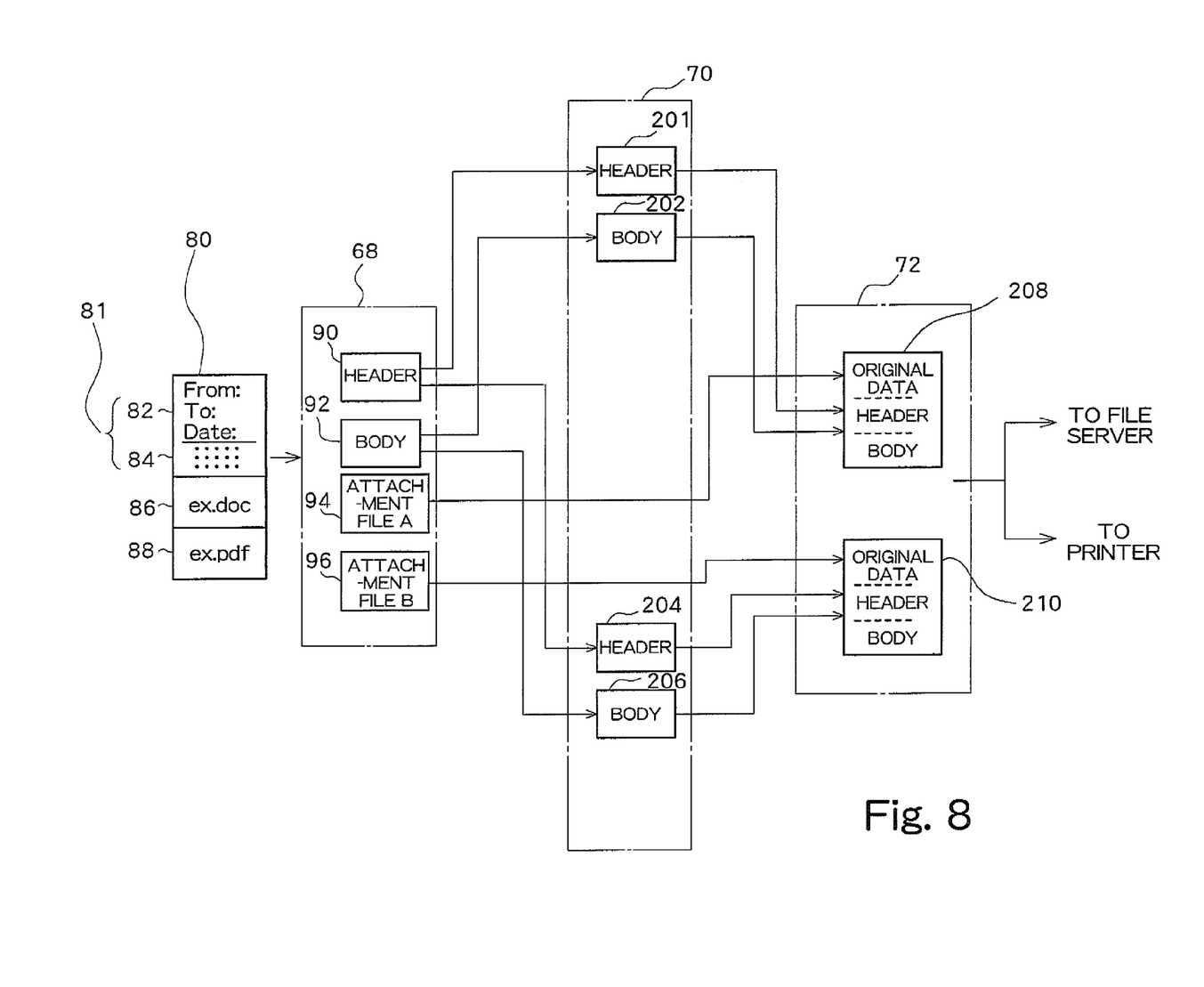
FIG. 8 is a diagrammatic view for explaining an alternative example of a process for an electronic mail.

FIG. 8 is a diagram for explaining another alternative exemplary embodiment. This exemplary embodiment shows a flow of a process when a form of "attachment file+mail body+header" shown by reference numeral 194 is selected in the setting window 180 of FIG. 4 similar to the example described with reference to FIG. 3. In this exemplary embodiment, however, the formats of the electronic files to be combined are changed. The format change may be set by the user in the setting window 180.

In this exemplary embodiment, the file format converter 70 converts the file formats of the header 90 and the body 92 and generates headers 201 and 204 and bodies 202 and 206. Of these, the header 200 and the body 202 are intermediate files generated according to the file format of the attachment file A 94, and the header 204 and the body 206 are intermediate files generated according to the format of the attachment file B 96. The file combining unit 72 combines the header 200 and the body 202 in continuous pages following the final page of the attachment file A 94 (that is, without a line feed), to generate a combined attachment file A 208. In other words, in the combined attachment file A 208, the header 200 and the body 202 are combined in continuous pages following the original data of the original attachment file A. That is, the row numbers are set so that the row number of the row in which the original data are placed is the smallest (earliest), the row number of the row in which the header is placed is next smallest, and the row number of the row in which the body is placed is the largest. When the amount of the original data, header, or body is large, however, a line feed is suitably inserted. Therefore, the row numbers are set such that, when the combined attachment file A 208 is displayed on a display device, first, the original data portion is displayed, and, with scrolling if necessary, the header is displayed next, and the body is finally displayed. In order to clarify the boundaries among the original data, header, and body, it is also possible to insert a blank space or a symbol (such as a separation line) between the data. The file combining unit 72 similarly combines the header 204 and the body 206 in continuous pages following the final page of the attachment file B 96, to generate a combined attachment file B 210. The file format of the intermediate file may be any format which allows combination by the file combining unit 72, and may be another file format such as a text data format.

Figure 9:
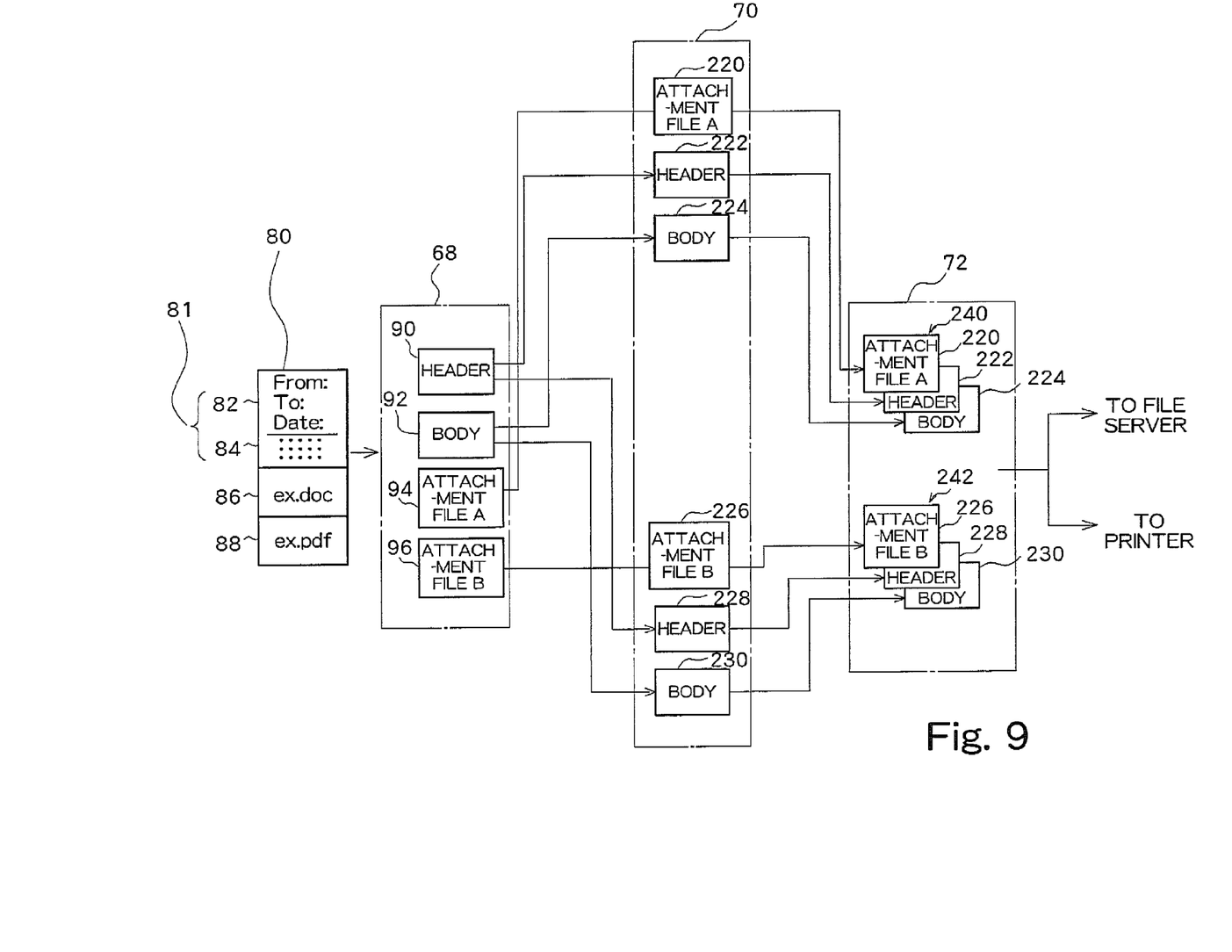
FIG. 9 is a diagrammatic view for explaining an alternative example of a process for an electronic mail.

An alternative exemplary embodiment shown in FIG. 9 relates to a process when a form of "attachment file+mail body+header" shown by reference numeral 194 is selected in the setting window 180 of FIG. 4 similar to the example described with reference to FIG. 3. In this alternative exemplary embodiment, however, the formats of the electronic files to be combined are changed. This change of setting may be executed, for example, by a user instructing through the setting window 180.

In this exemplary embodiment, the file format converter 70 converts the attachment file A 94, the header 90, and the body 92 into a certain common file format which differs from the file formats of these files, to generate an attachment file A 220, a header 222, and a body 224. Similarly, the file format converter 70 converts the attachment file B 96, the header 90, and the body 92 into a certain common file format which differs from the file formats of these files, to generate an attachment file B 226, a header 228, and a body 230. The file formats of the attachment file A 220 and the attachment file B 226 may be the same or different from each other. When the file formats are the same, the header 228 and the body 230 need not be generated, and the header 222 and the body 224 may be used instead. The file combining unit 72 combines the attachment file A 220, header 222, and body 224 in this page order, to generate a new electronic file 240. Similarly, the file combining unit 72 combines the attachment file B 226, header 228, and body 230 in this page order, to generate a new electronic file 242.

Figure 10:
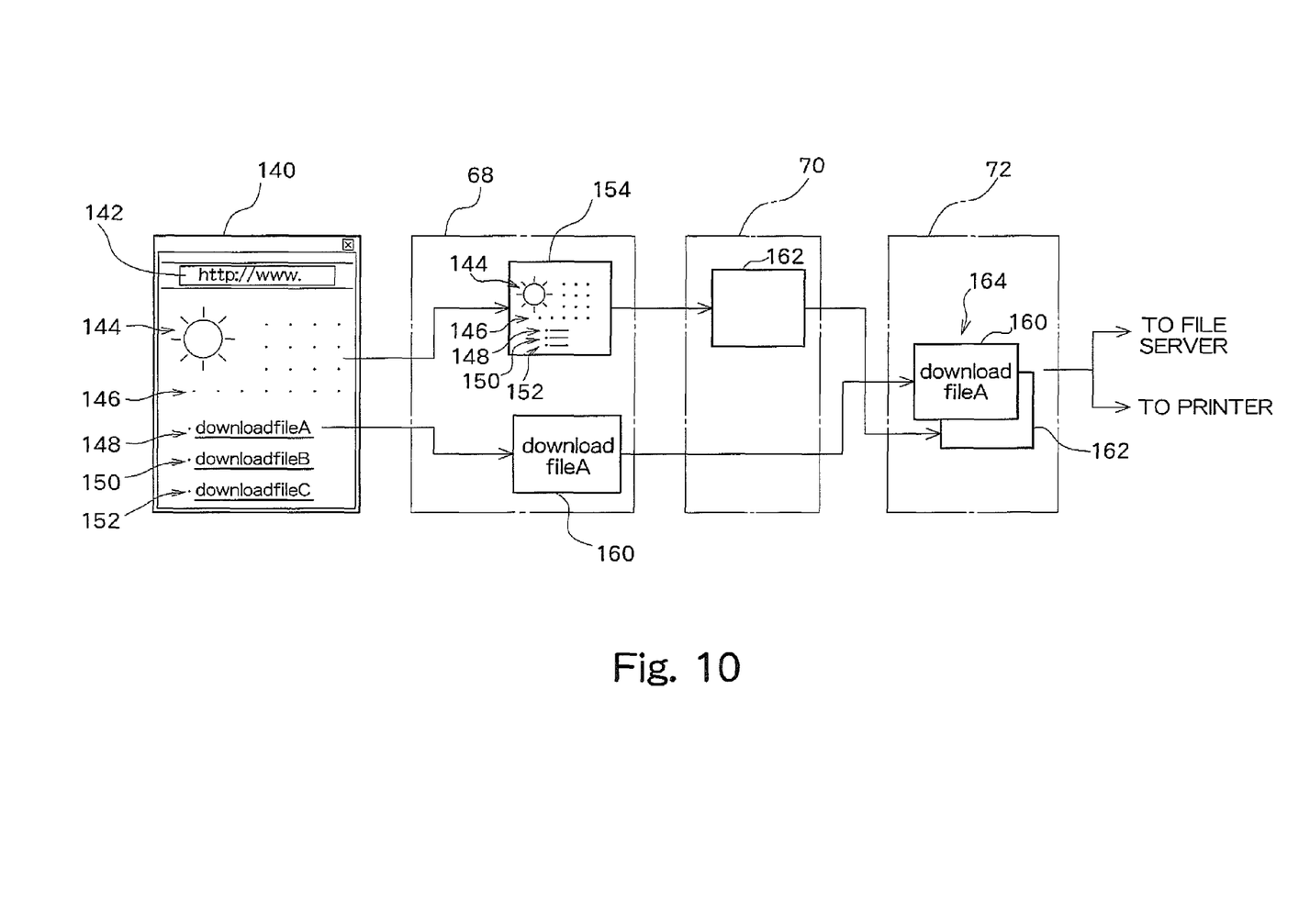
FIG. 10 is a diagrammatic view for explaining an example process in downloading from a webpage.

Finally, an example of storage of an electronic file received from a webpage will be described with reference to FIG. 10. In this example, a display corresponding to an HTML file designated by a URL 142 is realized in a web browser 140 displayed on the liquid crystal display 18. This display includes an image 144, a text string 146, and links 148, 150, and 152 to electronic files. In this configuration, when a user selects downloading of an electronic file corresponding to the link 148 (download fileA), only the electronic file 160 may be stored, as is normally performed, but in this example, the electronic file 160 is stored with information related to the link origin combined to the electronic file 160.

The electronic file element extraction unit 68 extracts, according to the setting of the combination setting unit 64, an electronic file 154 including the HTML file of the link origin. The electronic file 154 includes information of the image 144, the text string 146, and the links 148, 150, and 152, and may be configured to reproduce a display state which is approximately the same as that displayed on the web browser 140. The extent of extraction is limited in accordance with the set conditions such as, for example, the electronic files of link destinations of the links 150 and 152 are not selected.

The file format converter 70 executes a format conversion to convert the file format of the electronic file 154 into the same file format as the file format of an electronic file 160, to generate an electronic file 162. The file combining unit 72 piles the electronic file 160 and the electronic file 162 in this order to generate a combined electronic file 164. The generated combined electronic file 164 is transmitted to the file server 40 and the printer 50 similar to the case of the electronic mail.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with various modifications as are suited to the particular use contemplated. It is intended that the scope of the invention be defined by the following claims and their equivalents.

What is claimed is:

1. An electronic file processor comprising:
an acquisition unit that acquires, through a communication network, a first electronic file having a first file format and at least one second electronic file having a second file format which differs from the first file format, by reference to a linkage relationship between the first electronic file and the second electronic file;
a conversion unit that converts at least one of the first electronic file and the second electronic file so that the first electronic file and the second electronic file have a same file format; and
a generation unit that combines the first electronic file and the second electronic file to generate a combined electronic file, wherein
when the acquisition unit acquires a plurality of the second electronic files, the conversion unit converts the first electronic file to generate a converted first electronic file having a same file format as one of the second electronic files, the conversion unit further generates a reference information file indicating a reference destination of another one of the second electronic files in the same file format as said one of the second electronic files, and the generation unit electronically bundles the converted first electronic file, said one of the second electronic files, and the reference information file to generate a combined electronic file.

2. The electronic file processor according to claim 1, wherein
the same file format is the second file format, and
the combined electronic file has the second file format.

3. The electronic file processor according to claim 1, wherein
the same file format is a third file format which differs from the first file format and the second file format, and
the combined electronic file has the third file format.

4. The electronic file processor according to claim 1, wherein
the first electronic file is an electronic mail, and
the second electronic file is an attachment file attached to the electronic mail.

5. The electronic file processor according to claim 4, wherein
- a plurality of attachment files are attached to the electronic mail, and
- the processes performed by the conversion unit and the generation unit are executed for each attachment file.

6. The electronic file processor according to claim 4, further comprising:
- a re-combination unit that converts a file format of an electronic mail related to the electronic mail into the file format of the combined electronic file, and re-combines the electronic mail related to the electronic mail to the combined electronic file.

7. The electronic file processor according to claim 1, wherein
- location information of the second electronic file on the communication network is embedded in the first electronic file, and
- the acquisition unit acquires the second electronic file based on the location information embedded in the first electronic file.

8. The electronic file processor according to claim 1, wherein
- the generation unit assigns a file name to the combined electronic file based on a file name assigned to the second electronic file.

9. The electronic file processor according to claim 1, wherein
- the generation unit combines the electronic files in a form such that, when the combined electronic file is displayed on a display unit, the second electronic file is displayed before the first electronic file.

10. The electronic file processor according to claim 1, wherein
- when the acquisition unit acquires a plurality of said second electronic files, the conversion unit converts the first electronic file and one of the second electronic files to generate a converted first electronic file and a converted second electronic file, both the converted first electronic file and the converted second electronic file having a unification file format with relatively higher compression rate than a file format of said one of the second electronic files, the conversion unit generates the reference information file in the unification file format, and the generation unit generates the combined electronic file by electronically bundling the converted first electronic file, the converted second electronic file and the reference information file.

11. A computer-readable device storing a program causing a computer to execute an electronic file process, the electronic file process comprising:
- acquiring through a communication network a first electronic file having a first file format and at least one second electronic file having a second file format which differs from the first file format, by reference to a linkage relationship between the first electronic file and the second electronic file;
- converting at least one of the first electronic file and the second electronic file so that the first electronic file and the second electronic file have a same file format; and
- combining the first electronic file and the second electronic file to generate a combined electronic file, wherein the electronic file process further comprises,
- when a plurality of the second electronic files are acquired, converting the first electronic file to generate a converted first electronic file having a same file format as one of the second electronic files, generating a reference information file indicating a reference destination of another one of the second electronic files in the same file format as said one of the second electronic files, and electronically bundling the converted first electronic file, said one of the second electronic files, and the reference information file to generate a combined electronic file.

12. The computer-readable device according to claim 11, wherein
- the same file format is the second file format, and
- the combined electronic file has the second file format.

13. The computer-readable device according to claim 11, wherein the same file format is a third file format which differs from the first file format and the second file format, and
- the combined electronic file has the third file format.

14. A method of processing an electronic file, the method comprising:
- acquiring through a communication network a first electronic file having a first file format and at least one second electronic file having a second file format which differs from the first file format, by reference to a linkage relationship between the first electronic file and the second electronic file;
- converting at least one of the first electronic file and the second electronic file so that the first electronic file and the second electronic file have a same file format; and
- combining the first electronic file and the second electronic file to generate a combined electronic file, wherein the method further comprises,
- when a plurality of the second electronic files are acquired, converting the first electronic file to generate a converted first electronic file having the same file format as one of the second electronic files, generating a reference information file indicating a reference destination of another one of the second electronic files in the same file format as said one of the second electronic files, and combining the first electronic file, said one of the second electronic files, and the reference information file to generate a combined electronic file.

15. The method according to claim 14, wherein
the same file format is the second file format, and
the combined electronic file has the second file format.

16. The method according to claim 14, wherein
- the same file format is a third file format which differs from the first file format and the second file format, and
- the combined electronic file has the third file format.

17. An electronic file processor comprising:
- an acquisition unit that acquires an electronic mail and at least one attachment file attached to the electronic mail;
- a conversion unit that converts a file format of body data corresponding to a body of the electronic mail to a file format of the attachment file; and
- a generation unit that combines the body data with the attachment file to generate a combined electronic file, wherein
- when the acquisition unit acquires a plurality of the attachment files, the conversion unit converts the body data to generate converted body data having the a same file format one of the attachment files, the conversion unit further generates a reference information file indicating a reference destination of another one of the attachment files in the same file format as said one of the attachment files, and the generation unit electronically bundles the converted body data, said one of the attachment files, and the reference information file to generate a combined electronic file.

18. The electronic file processor according to claim 17, wherein
- a plurality of the attachment files are attached to the electronic mail,
- the conversion unit converts the file format of the body data to a file format of each attachment file, and
- the generation unit combines each set of body data having the file format converted by the conversion unit with an attachment file having a corresponding file format, to generate the combined electronic file for each attachment file.

19. The electronic file processor according to claim 17, wherein
- a plurality of the attachment files are attached to the electronic mail,
- the conversion unit converts the file format of the body data to a file format of one of the attachment files and converts file formats of the other attachment files to the file format of the one of the attachment files, and
- the generation unit combines the one of the attachment files, the body data having the file format converted by the conversion unit, and the other attachment files having the file format converted by the conversion unit.

20. A computer-readable device storing a program causing a computer to execute an electronic file process, the electronic file process comprising:
- acquiring an electronic mail and at least one attachment file attached to the electronic mail;
- converting a file format of body data corresponding to a body of the electronic mail to a file format of the attachment file; and
- combining the body data with the attachment file to generate a combined electronic file, wherein the electronic file process further comprises,
- when a plurality of the attachment files are acquired, converting the body data to generate converted body data having a same file format as one of the attachment files, generating a reference information file indicating a reference destination of another one of the attachment files in the same file format as said one of the attachment files, and electrically bundling the converted body data, said one of the attachment files, and the reference information file to generate a combined electronic file.

* * * * *